(12) United States Patent
Nishimura et al.

(10) Patent No.: US 12,269,913 B2
(45) Date of Patent: Apr. 8, 2025

(54) POLYTHIOL COMPOSITION AND APPLICATIONS THEREOF

(71) Applicant: MITSUI CHEMICALS, INC., Tokyo (JP)

(72) Inventors: Takeshi Nishimura, Yanagawa (JP); Masayuki Furuya, Arao (JP); Kouji Suesugi, Arao (JP)

(73) Assignee: MITSUI CHEMICALS, INC., Tokyo (JP)

( * ) Notice: Subject to any disclaimer, the term of this patent is extended or adjusted under 35 U.S.C. 154(b) by 622 days.

(21) Appl. No.: 17/619,843

(22) PCT Filed: Jul. 14, 2020

(86) PCT No.: PCT/JP2020/027362
§ 371 (c)(1),
(2) Date: Dec. 16, 2021

(87) PCT Pub. No.: WO2021/010392
PCT Pub. Date: Jan. 21, 2021

(65) Prior Publication Data
US 2022/0363805 A1    Nov. 17, 2022

(30) Foreign Application Priority Data

Jul. 17, 2019    (JP) ................................ 2019-131886

(51) Int. Cl.
*C08G 18/38*    (2006.01)
*C08G 18/76*    (2006.01)
*G02B 1/04*    (2006.01)

(52) U.S. Cl.
CPC ..... *C08G 18/3876* (2013.01); *C08G 18/7642* (2013.01); *G02B 1/041* (2013.01)

(58) Field of Classification Search
CPC ........................... C08G 18/3876; G02B 1/041
See application file for complete search history.

(56) References Cited

U.S. PATENT DOCUMENTS

| 2015/0094443 A1 | 4/2015 | Kawaguchi et al. |
| 2015/0126781 A1 | 5/2015 | Kawaguchi et al. |
| 2015/0133692 A1 | 5/2015 | Kawaguchi et al. |
| 2017/0009002 A1 | 1/2017 | Tsukada et al. |

FOREIGN PATENT DOCUMENTS

| KR | 10-1922168 B1 | 11/2018 |
| WO | 2014/027665 A1 | 2/2014 |
| WO | 2014027427 A1 | 2/2014 |
| WO | 2014027428 A1 | 2/2014 |
| WO | 2015119220 A1 | 8/2015 |

*Primary Examiner* — Michael L Leonard
(74) *Attorney, Agent, or Firm* — BUCHANAN INGERSOLL & ROONEY PC (57) ABSTRACT

A polythiol composition includes a polythiol compound (A) including at least one of 4,8-dimercaptomethyl-1,11-dimercapto-3,6,9-trithiaundecane, 4,7-dimercaptomethyl-1,11-dimercapto-3,6,9-trithiaundecane, or 5,7-dimercaptomethyl-1,11-dimercapto-3,6,9-trithiaundecane, and a polythiol compound (B) that is 4-mercaptomethyl-1,8-dimercapto-3,6-dithiaoctane.

15 Claims, 1 Drawing Sheet

POLYTHIOL COMPOSITION AND APPLICATIONS THEREOF

TECHNICAL FIELD

The present disclosure relates to a polythiol composition and applications thereof.

BACKGROUND ART

Plastic lenses are lighter in weight than inorganic lenses, are hard to break, and can be dyed. Therefore, in recent years, they have rapidly become widespread in optical elements such as spectacle lenses and camera lenses.

Regarding resins for the plastic lenses, higher performance has been required and a high refractive index, a high Abbe number, low specific density, high heat resistance and the like has been required. Various resin materials for lenses have been developed and used so far.

Among them, an optical material made of a polythiourethane-based resin has a high refractive index, a high Abbe number, and is excellent in impact resistance, dyeability, workability and the like. The polythiourethane-based resin is obtained by reacting a polythiol compound with a polyiso(thio)cyanate compound or the like.

Examples of literature in which a method of manufacturing a polythiol compound is described, include the following Patent Literature 1 and Patent Literature 2.

In Patent Literature 1, a method of manufacturing the polythiol compound in which 2-mercaptoethanol and an epihalohydrin compound are reacted, and the obtained polyalcohol compound is reacted with thiourea to obtain an isotyuronium salt, and the obtained isothiuronium salt is hydrolyzed, is disclosed.

In Patent Literature 2, a method of manufacturing the polythiol compound in which 2-mercaptoethanol and an epihalohydrin compound are reacted, the obtained compound is reacted with sodium sulfide to obtain a polyalcohol compound, and the obtained polyalcohol compound is reacted with thiourea to obtain an isotyuronium salt, and then the isothiuronium salt is hydrolyzed, is disclosed.

[Patent Literature 1] WO 2014/027427
[Patent Literature 1] WO 2014/027428

SUMMARY OF INVENTION

Technical Problem

As a resin formed by curing a polymerizable composition including a polythiol compound, excellent heat resistance and dyeability may be required. Therefore, a composition including a polythiol compound capable of manufacturing a resin excellent in balance between heat resistance and dyeability and the like are desired.

An objective of the present disclosure is to provide a polythiol composition capable of manufacturing a resin excellent in balance between heat resistance and dyeability and applications thereof.

Solution to Problem

The means for solving the above described problem include the following embodiments.

<1> A polythiol composition, comprising:
a polythiol compound (A) including at least one of 4,8-dimercaptomethyl-1,11-dimercapto-3,6,9-trithiaundecane, 4,7-dimercaptomethyl-1,11-dimercapto-3,6,9-trithiaundecane, or 5,7-dimercaptomethyl-1,11-dimercapto-3,6,9-trithiaundecane, and a polythiol compound (B) that is 4-mercaptomethyl-1,8-dimercapto-3,6-dithiaoctane.

<2> The polythiol composition according to <1>, wherein, in a high performance liquid chromatography measurement, a peak area of the polythiol compound (B) is 0.5 or more with respect to a total peak area 100 of compounds included in the polythiol composition.

<3> The polythiol composition according to <1>, wherein, in a high performance liquid chromatography measurement, a peak area of the polythiol compound (B) is 4 or more with respect to a total peak area 100 of compounds included in the polythiol composition.

<4> The polythiol composition according to <2>, wherein, in a high performance liquid chromatography measurement, a peak area of the polythiol compound (B) is 1.1 or less with respect to a total peak area 100 of compounds included in the polythiol composition.

<5> The polythiol composition according to <1>, wherein, in a high performance liquid chromatography measurement, a peak area of the polythiol compound (B) is more than 5.2 and less than 8.5 with respect to a total peak area 100 of compounds included in the polythiol composition.

<6> The polythiol composition according to <1>, wherein, in a high performance liquid chromatography measurement, a peak area of the polythiol compound (B) is more than 11.5 with respect to a total peak area 100 of compounds included in the polythiol composition.

<7> The polythiol composition according to any one of <1> to <6>, wherein, in a high performance liquid chromatography measurement, a peak area of the polythiol compound (A) is 90 or less with respect to a total peak area 100 of compounds included in the polythiol composition.

<8> The polythiol composition according to any one of <1> to <7>, wherein, in a high performance liquid chromatography measurement, a peak area of the polythiol compound (B) is 0.5 or more with respect to a total peak area 100 of the polythiol compound (A) and the polythiol compound (B).

<9> The polythiol composition according to any one of <1> to <8>, wherein the polythiol compound (A) is a compound obtained by using a catalyst including at least one selected from the group consisting of a metal hydroxide and a metal carbonate in a case of reacting 2-mercaptoethanol and an epihalohydrin compound represented by the following formula (5).

(5)

<10> The polythiol composition according to any one of <1> to <9>, wherein the polythiol compound (B) is a compound obtained by using a catalyst including at least one selected from the group consisting of a metal hydroxide and a metal carbonate in a case of reacting 2-mercaptoethanol and an epihalohydrin compound represented by the following formula (5).

(5)

<11> A polymerizable composition, comprising: the polythiol composition according to any one of <1> to <10>, and a polyiso(thio)cyanate compound.

<12> The polymerizable composition according to <11>, wherein the polyiso(thio)cyanate compound includes at least one selected from pentamethylene diisocyanate, hexamethylene diisocyanate, xylylene diisocyanate, isophorone diisocyanate, bis(isocyanatomethyl)cyclohexane, bis(isocyanatocyclohexyl)methane, 2,5-bis(isocyanatomethyl)bicyclo-[2.2.1]-heptane, 2,6-bis(isocyanatomethyl)bicyclo-[2.2.1]-heptane, tolylene diisocyanate, 4,4'-diphenylmethane diisocyanate or phenylenediisocyanate.

<13> A resin formed by curing the polymerizable composition according to <11> or <12>.

<14> A molded body comprising the resin according to <13>.

<15> A optical material comprising the resin according to <13>.

<16> A lens comprising the resin according to <13>.

Effects of Invention

According to the present disclosure, a polythiol composition capable of manufacturing a resin excellent in balance between heat resistance and dyeability and applications thereof can be provided.

DESCRIPTION OF EMBODIMENTS

In the present disclosure, the numerical range represented by "A to B" includes A and B as a minimum value and a maximum value, respectively.

In the present disclosure, when there are more than one kind of substances corresponding to a component of a composition, the amount of each component in the composition refers to a total amount of the plural substances existing in the composition, unless otherwise stated.

In the present disclosure, when numerical ranges are described in a stepwise manner, the upper limit value or the lower limit value of a numerical range may be replaced with the upper limit value or the lower limit value of other numerical range. In a numerical range described in the present disclosure, the upper limit or the lower limit of the numerical range may be replaced with a relevant value indicated in any of Examples.

In the present disclosure, "iso(thio)cyanate" means isocyanate or isothiocyanate.

[Polythiol Composition]

The polythiol composition in the present disclosure includes a polythiol compound (A) including at least one of 4,8-dimercaptomethyl-1,11-dimercapto-3,6,9-trithiaundecane, 4,7-dimercaptomethyl-1,11-dimercapto-3,6,9-trithiaundecane, or 5,7-dimercaptomethyl-1,11-dimercapto-3,6,9-trithiaundecane, and a polythiol compound (B) that is 4-mercaptomethyl-1,8-dimercapto-3,6-dithiaoctane. The polythiol composition in the present disclosure is capable of manufacturing a resin excellent in balance between heat resistance and dyeability by including at least the above-mentioned two types of polythiol compounds.

(Polythiol Compound (A))

The polythiol composition in the present disclosure includes the polythiol compound (A) including at least one of 4,8-dimercaptomethyl-1,11-dimercapto-3,6,9-trithiaundecane represented by the following formula (1), 4,7-dimercaptomethyl-1,11-dimercapto-3,6,9-trithiaundecane represented by the following formula (2), or 5,7-dimercaptomethyl-1,11-dimercapto-3,6,9-trithiaundecane represented by the following formula (3). The polythiol compound (A) may include one compound among these three compounds, or may include a mixture of two or three compounds among these three compounds.

(1)

(2)

(3)

In a high performance liquid chromatography measurement, from the viewpoint of dyeability of the resin, the peak area of the polythiol compound (A) is preferably 90 or less, more preferably 87 or less, still more preferably 84 or less, and particularly preferably 81 or less, with respect to the total peak area 100 of compounds included in the polythiol composition.

In the high performance liquid chromatography measurement, from the viewpoint of heat resistance of the resin, the peak area of the polythiol compound (A) is preferably 68 or more, more preferably 72 or more, still more preferably 76 or more, and particularly preferably 80 or more, with respect to the total peak area 100 of compounds included in the polythiol composition.

In the high performance liquid chromatography measurement, from the viewpoint of dyeability of the resin, the peak area of the polythiol compound (A) is preferably 99 or less, more preferably 97 or less, still more preferably 94 or less, and particularly preferably 93 or less, with respect to the total peak area 100 of the polythiol compound (A) and the polythiol compound (B).

In the high performance liquid chromatography measurement, from the viewpoint of heat resistance of the resin, the peak area of the polythiol compound (A) is preferably 75 or more, more preferably 80 or more, still more preferably 85 or more, and particularly preferably 91 or more, with respect to the total peak area 100 of the polythiol compound (A) and the polythiol compound (B).

The high performance liquid chromatography measurement may be carried out by the method described in the following EXAMPLES.

A method of manufacturing the polythiol compound (A) is not particularly limited, and the polythiol compound (A) can be manufactured by a known method. For example, the polythiol compound (A) can be manufactured by the method described in WO 2014/027428.

The polythiol compound (A) is preferably the compound obtained by using a catalyst including at least one selected from the group consisting of metal hydroxides such as sodium hydroxide, and potassium hydroxide, and metal carbonates such as sodium carbonate, and potassium carbonate in a case of reacting 2-mercaptoethanol and an epihalohydrin compound represented by the following formula (5) to obtain a compound represented by the following formula (6). From the viewpoint of reactivity and economy, sodium hydroxide is preferably used as a catalyst. Regarding the detailed conditions for obtaining the compound represented by the formula (6) and the subsequent reaction until the polythiolization compound (A) is obtained, the above-mentioned WO 2014/027428 may be referred to. The total amount of a tertiary amine, a quaternary ammonium, triphenylphosphine and a chromium compound in the above-mentioned catalyst is preferably less than 0.001 mol, more preferably 0.0005 mol or less, and still more preferably 0 mol, with respect to 1 mol of the epihalohydrin compound represented by the following formula (5). By using the catalyst including at least one of the metal hydroxides or the metal carbonates, and especially the metal hydroxide such as sodium hydroxide, a color phase of the polythiol compound (A) manufactured tends to be improved, and further the thickening rate of the polymerizable composition obtained by mixing the polythiol composition including the polythiol compound (A) and the polyiso(thio)cyanate compound is suppressed and the pot life tends to be improved.

(5)

(6)

(Polythiol Compound (B))

The polythiol composition includes the polythiol compound (B) that is 4-mercaptomethyl-1,8-dimercapto-3,6-dithiaoctane represented by the following formula (4).

(4)

In the high performance liquid chromatography measurement, from the viewpoint of dyeability of the resin, the peak area of the polythiol compound (B) is required to be more than 0, for example, preferably 0.5 or more, more preferably 1 or more, still more preferably 3 or more, and particularly preferably 4 or more, extremely preferably more than 6, even more preferably 9 or more, and even more preferably more than 11.5, with respect to the total peak area 100 of compounds included in the polythiol composition.

In the high performance liquid chromatography measurement, from the viewpoint of heat resistance of the resin, the peak area of the polythiol compound (B) is preferably 20 or less, more preferably 15 or less, still more preferably 10 or less, particularly preferably less than 8.5, and extremely preferably less than 1.1, with respect to the total peak area 100 of compounds included in the polythiol composition. Since the peak area of the polythiol compound (B) is 10 or less with respect to the total peak area of 100 of compounds included in the polythiol composition, the dyeability tends to be adjusted while maintaining high heat resistance. For example, in a case in which the above-mentioned value is 10 or less, the dyeability tends to be improved by increasing the above-mentioned value.

In the high performance liquid chromatography measurement, from the viewpoint of both the dyeability and heat resistance of the resin, the peak area of the polythiol compound (B) is preferably more than 5.2 and less than 8.5 with respect to the total peak area 100 of compounds included in the polythiol composition.

In the high performance liquid chromatography measurement, from the viewpoint of the dyeability of the resin, the peak area of the polythiol compound (B) is preferably 0.5 or more, more preferably 1 or more, still more preferably 3 or more, particularly preferably 4 or more, extremely preferably 6 or more, and even more preferably 7 or more, with respect to the total peak area 100 of the polythiol compound (A) and the polythiol compound (B).

In the high performance liquid chromatography measurement, from the viewpoint of heat resistance of the resin, the peak area of the polythiol compound (B) is preferably 23 or less, more preferably 17 or less, still more preferably 12 or less, and particularly preferably 9.5 or less, with respect to the total peak area 100 of the polythiol compound (A) and the polythiol compound (B). Since the peak area of the polythiol compound (B) is 12 or less with respect to the total peak area 100 of the polythiol compound (A) and the polythiol compound (B), the dyeability tends to be adjusted while maintaining heat resistance. For example, in a case in which the above-mentioned value is 12 or less, the dyeability tend to be improved by increasing the above-mentioned value.

A method of manufacturing the polythiol compound (B) is not particularly limited, and the polythiol compound (B) can be manufactured by a known method. For example, the polythiol compound (B) can be manufactured by the method described in WO 2014/027427. The polythiol compound (B) is preferably the compound obtained by using a catalyst including at least one selected from the group consisting of metal hydroxides such as sodium hydroxide, and potassium hydroxide, and metal carbonates such as sodium carbonate, and potassium carbonate in a case of reacting 2-mercaptoethanol and the epihalohydrin compound represented by the above-mentioned formula (5).

<Measurement of Peak Area of Polythiol Compound (A) and Polythiol Compound (B)>

The peak area of the polythiol compound (A) and the polythiol compound (B) with respect to the total peak area 100 of the compounds included in the polythiol composition can be determined by carrying out the high performance liquid chromatography (HPLC) measurement based on the following conditions. The peak area appearing in the retention time of 12.0 to 13.5 minutes may be judged as the peak area of the polythiol compound (B), and the peak area appearing in the retention time of 22.0 to 28.0 minutes may be judged as the peak area of the polythiol compound (A).
(HPLC Conditions)
Column: YMC-Pack ODS-AA-312 (S5Φ6 mm×150 mm)
Mobile phase: Acetonitrile/0.01 mol/L-potassium dihydrogen phosphate aqueous solution=60/40 (vol/vol)
Column temperature: 40° C.
Flow rate: 1.0 ml/min
Detector: UV detector, wavelength 230 nm
Preparation of measurement solution: 160 mg of sample is dissolved and mixed with 10 ml of acetonitrile.
Injection volume: 2 μL The polythiol composition in the present disclosure may include a compound other than the polythiol compound (A) and the polythiol compound (B), or may include a polythiol compound having a mercapto group other than the polythiol compound (A) and the polythiol compound (B) (hereinafter, also referred to as "another polythiol compound") and the like.

Examples of another polythiol compound include methane dithiol, 1,2-ethanedithiol, 1,2,3-propane trithiol, pentaerythritol tetrakis(2-mercaptoacetate), pentaerythritol tetrakis(3-mercaptopropionate), bis(mercaptoethyl)sulfide, 2,5-dimercaptomethyl-1,4-dithiane, tetrakis(mercaptomethylthiomethyl)methane, tetrakis(2-mercaptoethylthiomethyl) methane, tetrakis(3-mercaptopropylthiomethyl)methane, bis(2,3-dimercaptopropyl)sulfide, 2,5-dimercaptomethyl-1, 4-dithiane, 2,5-dimercapto-1,4-dithiane, 2,5-dimercaptomethyl-2,5-dimethyl-1,4-dithiane, 1,1,3,3-tetrakis(mercaptomethylthio)propane, 1,1,2,2-tetrakis(mercaptomethylthio) ethane, and 4,6-bis (mercaptomethylthio)-1,3-dithiane.

[Polymerizable Composition]

The polymerizable composition in the present disclosure includes the above-mentioned polythiol composition in the present disclosure, and a polyiso(thio)cyanate compound.
(Polyiso(Thio)Cyanate Compound)

The polyiso(thio)cyanate compound is not particularly limited as long as it is possible to exhibit the effect of the present invention, and as the polyiso(thio)cyanate compound, conventionally known compounds may be used. The compound is not particularly limited as long as it is a compound having at least two or more iso(thio)cyanate groups in one molecule, and specifically, examples thereof include aliphatic polyisocyanate compounds such as tetramethylene diisocyanate, pentamethylene diisocyanate, hexamethylene diisocyanate, heptamethylene diisocyanate, octamethylene diisocyanate, 2,2,4-trimethylhexamethylene diisocyanate, 2,4,4-trimethylhexamethylene diisocyanate, lysine diisocyanate methyl ester, lysine triisocyanate, and xylylene diisocyanate;

alicyclic polyisocyanate compounds such as isophorone diisocyanate, bis (isocyanatomethyl)cyclohexane, bis (isocyanatocyclohexyl)methane, dicyclohexyldimethylmethane diisocyanate, 2,5-bis(isocyanatomethyl)bicyclo-[2.2.1]-heptane, 2,6-bis(isocyanatomethyl) bicyclo-[2.2.1]-heptane, 3,8-bis(isocyanatomethyl) tricyclodecane, 3,9-bis(isocyanatomethyl) tricyclodecane, 4,8-bis(isocyanatomethyl) tricyclodecane, and 4,9-bis(isocyanatomethyl) tricyclodecane;

aromatic polyisocyanate compounds such as tolylene diisocyanate, 4,4'-diphenylmethane diisocyanate, diphenyl sulfide-4,4-diisocyanate, and phenylene diisocyanate;

heterocyclic polyisocyanate compounds such as 2,5-diisocyanatothiophene, 2,5-bis(isocyanatomethyl)thiophene, 2,5-diisocyanatotetrahydrothiophene, 2,5-bis (isocyanatomethyl)tetrahydrothiophene, 3,4-bis (isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolan, and 4,5-bis (isocyanatomethyl)-1,3-dithiolane;

aliphatic polyisothiocyanate compounds such as hexamethylene diisothiocyanate, lysine diisothiocyanate methyl ester, lysine triisothiocyanate, and xylylene isothiocyanate;

alicyclic polyisothiocyanate compounds such as isophoron diisothiocyanate, bis(isothiocyanatomethyl)cyclohexane, bis(isothiocyanatocyclohexyl)methane, cyclohexanediisothiocyanate, methylcyclohexanediisothiocyanate, 2,5-bis(isothiocyanatomethyl)bicyclo-[2.2.1]-heptane, 2,6-bis(isothiocyanatomethyl)bicyclo-[2.2.1]-heptane, 3,8-bis(isothiocyanatomethyl) tricyclodecane, 3,9-bis(isothiocyanatomethyl) tricyclodecane, 4,8-bis(isothiocyanatomethyl) tricyclodecane, and 4,9-bis(isothiocyanatomethyl) tricyclodecane;

aromatic polyisothiocyanate compounds such as tolylene isothiocyanate, 4,4-diphenylmethane diisothiocyanate, and diphenyl disulfide-4,4-diisothiocyanate; and sulfur-containing heterocyclic polyisothiocianate compounds such as 2,5-diisothiocianatothiophene, 2,5-bis (isothiocyanatomethyl)thiophene, 2,5-isothiocianatotetrahydrothiophene, 2,5-bis(isothiocyanatomethyl) tetrahydrothiophene, 3,4-bis(isothiocyanatomethyl) tetrahydrothiophene, 2,5-diisothiocianato-1,4-dithiane, 2,5-bis(isothiocyanatomethyl)-1,4-dithiane, 4,5-diisothiocianato-1,3-dithiolane and 4,5-bis(isothiocianatomethyl)-1,3-dithiolane. The polyiso(thio)cyanate compound can include at least one selected from these.

As the polyiso(thio)cyanate compound, halogen-substituted products such as these chlorine-substituted products, and bromine-substituted products, alkyl-substituted products, alkoxy-substituted products, nitro-substituted products, prepolymer-type modifications with polyhydric alcohols, carbodiimide modified products, urea modified products, bullet modified products, dimerization or trimerization reaction products, and the like can also be used.

As the polyiso(thio)cyanate compound, a polyisocyanate compound is preferable, and it is preferable that the polyiso (thio)cyanate compound includes at least one selected from pentamethylene diisocyanate, hexamethylene diisocyanate, xylylene diisocyanate, isophorone diisocyanate, bis(isocyanatomethyl)cyclohexane, bis(isocyanatocyclohexyl)methane, 2,5-bis(isocyanatomethyl)bicyclo-[2.2.1]-heptane, 2,6-bis(isocyanatomethyl)bicyclo-[2.2.1]-heptane, tolylene diisocyanate, 4,4'-diphenylmethane diisocyanate and phenylenediisocyanate.

The mixing ratio of the polythiol composition and the polyiso(thio)cyanate compound is not particularly limited and for example, the molar ratio of the mercapto group of the polythiol compound included in the polythiol composition and the iso(thio)cyanate group of the polyiso(thio)cyanate compound (mercapto group/iso(thio)cyanate group) is preferably from 0.5 to 3.0, more preferably from 0.6 to 2.0, and still more preferably from 0.8 to 1.3. When the mixing ratio is within the above range, it tends to be possible to satisfy various performances such as a refractive index and heat resistance required for plastic lenses and the like in a well-balanced manner.

The polymerizable composition in the present disclosure may include at least one other component other than the polythiol compound and the polyiso(thio)cyanate compound for the purpose of improving various physical properties of the resin, operability, polymerization reactivity of the polymerizable composition and the like.

Examples of the at least one other component include polymerization catalysts, internal mold release agents, resin modifiers, chain extenders, cross-linking agents, radical trapping agents, light stabilizers, UV absorbers, antioxidants, oil-soluble dyes, fillers, adhesion improvers, antibacterial agents, antistatic agents, dyes, fluorescent whitening agents, fluorescent pigments, and blue ink agents such as inorganic pigments.

Examples of the polymerization catalysts include tertiary amine compounds, inorganic acid salts or organic acid salts thereof, metal compounds, quaternary ammonium salts, and organic sulfonic acids.

As the internal mold release agents, an acidic phosphoric acid ester can be used. Examples of the internal mold release agents can include phosphoric acid monoesters and phosphoric acid diesters, which can be used alone or in combination of two or more respectively.

Examples of the resin modifiers include episulfide compounds, alcohol compounds, amine compounds, epoxy compounds, organic acids and its anhydrides, and olefin compounds including (meth)acrylate compounds or the like.

The polymerizable composition in the present disclosure can be obtained by mixing the above components.

In the polymerizable composition in the present disclosure, the glass transition temperature Tg when cured into a molded body is preferably 100° C. or higher, more preferably 101° C. or higher, still more preferably 102° C. or higher, and particularly preferably 102.5° C. or higher. In the polymerizable composition in the present disclosure, the above-mentioned glass transition temperature Tg may be 104° C. or less, or 103° C. or less.

In particular, in a case in which the peak area of the above-mentioned polythiol compound (B) is more than 6 or 9 or more with respect to the total peak area 100 of the compounds included in the polythiol composition, from the view point of both heat resistance and dyeability, in the polymerizable composition in the present disclosure, it is preferable that the above-mentioned glass transition temperature Tg satisfies the above-mentioned numerical range.

In the present disclosure, the glass transition temperature Tg when formed into the molded body is a value measured by the method described in the following EXAMPLES using a plastic lens molded according to <Manufacturing of Plastic Lens> in EXAMPLES.

[Molded Body]

The molded body in the present disclosure includes the resin formed by curing the polymerizable composition in the present disclosure. The method for manufacturing the molded body in the present disclosure is not particularly limited, and a preferred manufacturing method includes cast polymerization. First, the polymerizable composition is injected between the molding molds held by a gasket, tape or the like. At this time, depending on the physical characteristics required for the obtained plastic lens, it is often preferable to perform defoaming treatment under reduced pressure, filtration treatment such as pressurization and depressurization, and the like, if necessary.

The polymerization conditions are not limited since they differ greatly depending on the composition of the polymerizable composition, the type and used amount of the catalyst, the shape of the mold, and the like, and for example, at a temperature of −50° C. to 150° C., the polymerization is carried out for 1 hour to 50 hours. In some cases, it is preferable to keep the temperature in the temperature range of 10° C. to 150° C. or to gradually raise the temperature to cure in 1 hour to 48 hours.

If necessary, the molded body may be subjected to a treatment such as annealing. The treatment such as annealing is usually carried out between 50° C. and 150° C., preferably 90° C. to 140° C., and more preferably 100° C. to 130° C.

[Uses]

The resins obtained from the polymerizable composition in the present disclosure may be obtained as molded bodys having various shapes by changing the type of mold during casting polymerization.

Since from the molded body obtained from the polymerizable composition in the present disclosure, a material having excellent dimming performance and surface strength without impairing transparency can be obtained, the molded body can be used for various optical materials such as plastic lenses. In particular, it can be suitably used as plastic spectacle lenses or plastic polarized lenses.

[Plastic Spectacle Lens]

The plastic spectacle lens in which a lens substrate made of molded body in the present disclosure optionally may have a coating layer on one surface or both surfaces.

The plastic spectacle lens in the present disclosure includes the lens base material formed by curing the above-mentioned polymerizable composition and the coating layer.

Examples of the coating layer include, specifically, a primer layer, a hard coat layer, an antireflection layer, an anti-fogging coat layer, an anti-contamination layer, and a water repellent layer. Each of these coating layers can be used alone, or a plurality of coating layers can be used in a multi-layered manner. In a case in which the coating layers are applied to both surfaces, the same coating layer may be applied to each surface, or different coating layers may be applied to each surface.

In each of these coating layers, an infrared absorbing agent for the purpose of protecting eyes from infrared rays, a light stabilizer, an antioxidant or the like for the purpose of improving weather resistance of the lens, a photochromic compound for the purpose of enhancing fashionability of the lens, a dye, a pigment, a known additive such as an antistatic agent for the purpose of enhancing the performance of the lens, or the like may be used in combination.

Various leveling agents for the purpose of improving the coatability may be used for the layer to be coated by coating.

An anti-fog layer, the anti-contamination layer, or the water-repellent layer may be formed on the anti-reflection layer, if necessary.

Although the embodiments of the present invention have been described above, these are examples of the present invention, and various configurations other than the above can be adopted as long as the effects of the present invention are not impaired.

EXAMPLES

Hereinafter, the present disclosure will be more specifically described by examples, the present disclosure is not limited to the following examples as long as the gist is not exceeded. Unless otherwise specified, "parts" are based on mass.

<Evaluation Method>

In the examples, evaluation methods of the properties of the plastic lenses are as follows. The results are shown in Table 1.

Refractive index (ne), Abbe number (ve): Using a refractometer KPR-20 (manufactured by Carnew Optical Industry Co., Ltd.), the refractive indexes (ne, nF', nC') in wavelength 546.1 nm (mercury e-ray), wavelength 480.0 nm (Cd F' ray) and wavelength 643.9 nm (Cd C' ray) were measured at 20° C. to determine the Abbe number (ve).

Heat resistance: The glass transition temperature Tg by the TMA penation method (50 g load, pin tip 0.5 mmφ, heating rate 10° C./min) was measured and used as an index of heat resistance.

Resin specific density: it was measured by the Archimedes method.

YI (Y. I. value): A resin was prepared as a circular flat plate plastic lens having a thickness of 9 mm and a diameter of 75 mm, and by using a color difference meter CT-210 manufactured by Konica Minolta, INC., chromaticity coordinates x and y were measured. Based on the values of x and y, which were the measurement results, Y. I. value was calculated by the following formula (5).

$$Y.\ I.\ \text{Value} = (234 \times x + 106 \times y + 106)/y \qquad (5)$$

There is a correlation that the smaller the Y. I. value, the better the color phase of the plastic lens, and the larger the Y. I. value, the worse the color phase.

Dyeability (light transmission): 2.3 g of "FSP Red EA" (manufactured by FUTABA SANGYO CO., LTD., dye), 1.5 g of "FSP Yellow P-E" (manufactured by FUTABA SANGYO CO., LTD., dye), 6.0 g of "FSP Blue AUL-S" (manufactured by FUTABA SANGYO CO., LTD., dye), 6.0 g of "Nikkasan Salt #7000" (manufactured by NICCA CHEMICAL CO., LTD. dye dispersant), and 6.0 g of "DK-CN" (manufactured by Daiwa Chemical Industry Co., Ltd., dyeing aid) were added to 3000 g of pure water to prepare a dye dispersion. A resin having a thickness of 9 mm was immersed in the dye dispersion at 80° C. for 30 minutes and was dyed. The light transmittance (%) of the dyed resin at 350 nm to 800 nm was measured. Table 1 shows the light transmittance (%) at 638 nm, 567 nm and 452 nm, respectively.

The more dyed, the more light is absorbed by the dye, so the lower the light transmittance at each wavelength, the better the dyeability.

Figure 1:
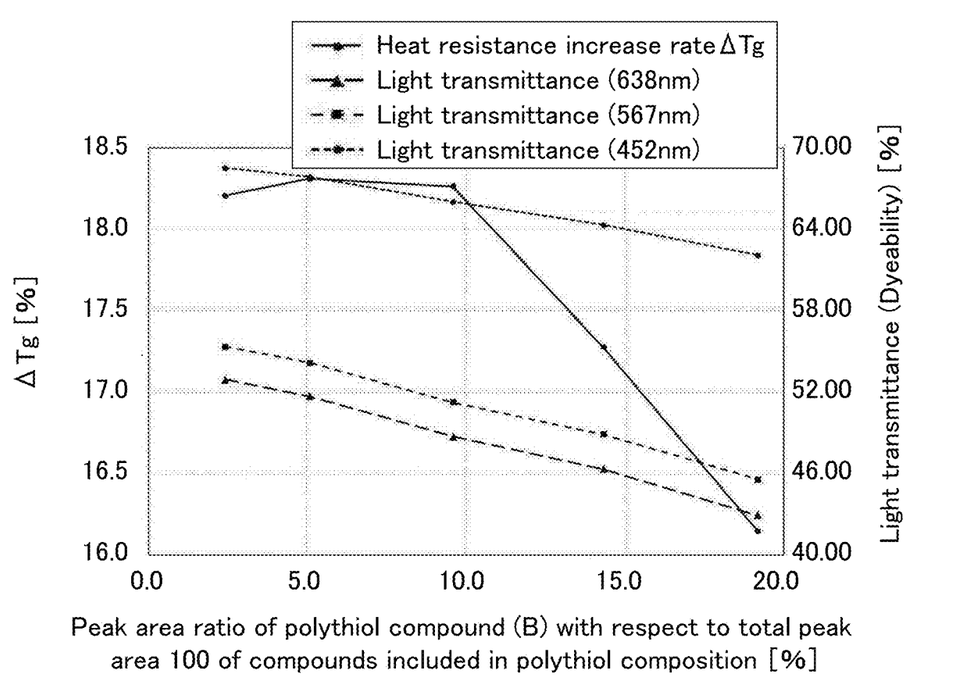
FIG. 1 is a graph showing the relationship between a peak area ratio of the polythiol compound (B) with respect to the total peak area 100 of compounds included in the polythiol composition in each of Examples 1 to 5, and ΔTg and optical transparency in each of Manufacturing Examples 1 to 5.

Further, in Examples 1 to 5 described later, a graph showing the relationship between the peak area ratio of the polythiol compound (B) to the total peak area 100 of the compounds contained in the polythiol composition, and ΔTg described later and the light transmittance is shown in FIG. 1.

<Synthesis of Polythiol Compound (A)>

51.2 parts by mass of 2-mercaptoethanol, 26.5 parts by mass of degassed water, and 0.16 parts by mass of a 49% by mass sodium hydroxide aqueous solution were charged into the reactor. 61.99 parts by mass of epichlorohydrin was added dropwise at 9° C. to 11° C. over 6.5 hours, and then the mixture was stirred for 60 minutes. From the NMR data, the generation of 1-chloro-3-(2-hydroxyethylthio)-2-propanol was confirmed.

Then, 150.0 parts by mass of a 17.3% sodium sulfide aqueous solution was added dropwise at 7° C. to 37° C. over 5.5 hours, and the mixture was stirred for 120 minutes. From the NMR data, the generation of the tetraol compound was confirmed. 279.0 parts by mass of 35.5% hydrochloric acid was charged, then 125.8 parts by mass of thiourea with a purity of 99.90% was charged, and the mixture was stirred under reflux at 110° C. for 3 hours to carry out a thiouronium chlorination reaction. After cooling to 45° C., 214.0 parts by mass of toluene was added, the mixture was cooled to 26° C., and 206.2 parts by mass of a 25% by mass aqueous ammonia solution was charged at 26° C. to 50° C. over 30 minutes, a hydrolysis reaction was carried out by stirring the mixture at 50° C. to 65° C. for 1 hour, and a toluene solution of polythiols including 4,8-dimercaptomethyl-1,11-dimercapto-3,6,9-trithiaundene, 4,7-dimercaptomethyl-1,11-dimercapto-3,6,9-trithiaundecane and 5,7-dimercaptomethyl-1,11-dimercapto-3,6,9-trithiaundecane as main components was obtained. 59.4 parts by mass of 36% hydrochloric acid was added to the toluene solution, and acid washing was carried out twice at 34° C. to 39° C. for 30 minutes. 118.7 parts by mass of degassed water was added, and washing was carried out 5 times at 35° C. to 45° C. for 30 minutes. After removing toluene and a trace amount of water under heating and reduced pressure, the mixture was filtered under reduced pressure with a 1.2 μm PTFE type membrane filter. As a result, 115.9 parts by mass of the polythiol composition (A) including 4,8-dimercaptomethyl-1,11-dimercapto-3,6,9-trithiaundecane, 4,7-dimercaptomethyl-1,11-dimercapto-3,6,9-trithiaundecane and 5,7-dimercaptomethyl-1,11-dimercapto-3,6,9-trithiaundecane, which are polythiol compounds (A), as main components was obtained.

<Synthesis of Polythiol Compound (B)>

124.6 parts by mass of 2-mercaptoethanol, and 18.3 parts by mass of degassed water were charged into the reactor. After 101.5 parts by mass of a 32% by mass sodium hydroxide aqueous solution was added dropwise over 40 minutes, 73.6 parts by mass of epichlorohydrin was added dropwise at 29° C. to 36° C. over 4.5 hours, and then the mixture was stirred for 40 minutes. From the NMR data, the generation of 1,3-bis(2-hydroxyethylthio)-2-propanol was confirmed. 331.5 parts by mass of 35.5% hydrochloric acid was charged, then 183.8 parts by mass of thiourea with a purity of 99.90% was charged, and the mixture was stirred under reflux at 110° C. for 3 hours to carry out a thiouronium chlorination reaction. After cooling to 45° C., 320.5 parts by mass of toluene was added, the mixture was cooled to 31° C., and 243.1 parts by mass of a 25% by mass aqueous ammonia solution was charged at 31° C. to 41° C. over 44 minutes, a hydrolysis reaction was carried out by stirring the mixture at 54° C. to 62° C. for 3 hours, and a toluene solution of polythiols including 4-mercaptomethyl-1,8-dimercapto-3,6-dithiaoctane as a main component was obtained. 162.8 parts by mass of 35.5% hydrochloric acid was added to the toluene solution, and acid washing was carried out once at 35° C. to 43° C. for 1 hour. 174.1 parts by mass of degassed water was added, and washing was carried out twice at 35° C. to 45° C. for 30 minutes. 162.1 parts by mass of 0.1% aqueous ammonia was added, and the mixture was washed for 30 minutes. 174.2 parts by mass of degassed water was added, and washing was carried out twice at 35° C. to 45° C. for 30 minutes. After removing toluene and a trace amount of water under heating and reduced pressure, the mixture was filtered under reduced pressure with a 1.2 μm PTFE type membrane filter to obtain 205.0 parts by mass of the polythiol composition (B) including 4-mercaptomethyl-1,8-dimercapto-3,6-dithiaoctane, which is the polythiol compound (B), as a main component.

Examples 1 to 5

The polythiol composition (A) and the polythiol composition (B) obtained as described above were mixed at different mixing ratios respectively to obtain the polythiol compositions in Examples 1 to 5.

Comparative Example 1

The polythiol composition (B) obtained as described above was used as the polythiol composition in Comparative Example 1.

<Measurement of Ratio of Polythiol Compound (A) and Polythiol Compound (B) by HPLC (Area %)>

Regarding the polythiol compositions in Examples 1 to 5, the high performance liquid chromatography measurement was carried out based on the following conditions, and the peak area of the polythiol compound (A) and the polythiol compound (B) with respect to the total peak area 100 of the compounds included in the polythiol composition was determined. The peak area appearing in the retention time of 12.0 to 13.5 minutes was judged as the peak area of the polythiol compound (B), and the peak area appearing in the retention time of 22.0 to 28.0 minutes was judged as the peak area of the polythiol compound (A).

(HPLC Conditions)
  Column: YMC-Pack ODS-AA-312 (S5Φ6 mm×150 mm)
  Mobile phase: Acetonitrile/0.01 mol/L-potassium dihydrogen phosphate aqueous solution=60/40 (vol/vol)
  Column temperature: 40° C.
  Flow rate: 1.0 ml/min
  Detector: UV detector, wavelength 230 nm
  Preparation of measurement solution: 160 mg of sample is dissolved and mixed with 10 ml of acetonitrile.
  Injection volume: 2 μL <Production of Plastic Lenses>

Production Example 1

50.6 parts by mass of m-xylylene diisocyanate, 0.01 parts by mass of dibutyltin dichloride as a curing catalyst, 0.10 parts by mass of Zelec UN (trade name Stepan Company products; acidic phosphoric acid ester) and 0.05 parts by mass of Biosorb 583 (manufactured by KYODO CHEMICAL COMPANY LIMITED.; UV absorber) were mixed and dissolved at 20° C. 49.4 parts by mass of the obtained polythiol composition in Example 1 was charged and mixed to prepare a mixed uniform liquid. The uniform liquid was defoamed at 600 Pa for 1 hour, filtered through a 1 μm Teflon (registered trademark) filter, and then injected into a mold made of a glass mold and a tape. The mold was put into an oven, the temperature was gradually raised from 10° C. to 120° C., and polymerization was carried out for 20 hours. After completion of the polymerization, the mold was taken out from the oven and released to obtain a resin. The obtained resin was further annealed at 120° C. for 3 hours to manufacture a plastic lens. Each physical property was determined based on the above-mentioned evaluation method for each physical property of the plastic lens.

Production Example 2

In Production Example 1, a plastic lens was manufactured by the method described in Production Example 1 except that 50.7 parts by mass of m-xylylene diisocyanate was used, and 49.4 parts by mass of the polythiol composition in Example 1 was changed to 49.4 parts by mass of the polythiol composition in Example 2. Each physical property was determined based on the above-mentioned evaluation method for each physical property of the plastic lens.

Production Example 3

In Production Example 1, a plastic lens was manufactured by the method described in Production Example 1 except that 50.7 parts by mass of m-xylylene diisocyanate was used, and 49.4 parts by mass of the polythiol composition in Example 1 was changed to 49.3 parts by mass of the polythiol composition in Example 3. Each physical property was determined based on the above-mentioned evaluation method for each physical property of the plastic lens.

Production Example 4

In Production Example 1, a plastic lens was manufactured by the method described in Production Example 1 except that 50.8 parts by mass of m-xylylene diisocyanate was used, and 49.4 parts by mass of the polythiol composition in Example 1 was changed to 49.2 parts by mass of the polythiol composition in Example 4. Each physical property was determined based on the above-mentioned evaluation method for each physical property of the plastic lens.

Production Example 5

In Production Example 1, a plastic lens was manufactured by the method described in Production Example 1 except that 50.8 parts by mass of m-xylylene diisocyanate was used, and 49.4 parts by mass of the polythiol composition in Example 1 was changed to 49.2 parts by mass of the polythiol composition in Example 5. Each physical property was determined based on the above-mentioned evaluation method for each physical property of the plastic lens.

Production Example 6

In Production Example 1, a plastic lens was manufactured by the method described in Production Example 1 except that 52.0 parts by mass of m-xylylene diisocyanate was used, 49.4 parts by mass of the polythiol composition in Example 1 was changed to 48.0 parts by mass of the polythiol composition in Comparative Example 1, and 0.015 parts by mass of dibutyltin dichloride was used. Each physical property was determined based on the above-mentioned evaluation method for each physical property of the plastic lens.

The respective physical properties of the plastic lens in Production Examples 1 to 5 obtained by using the polythiol compositions in Examples 1 to 5 are shown in Table 1. The heat resistance of the plastic lens in Production Example 6 obtained by using the polythiol composition in Comparative Example 1 was 87.0° C.

ΔTg [%] shown in Table 1 means the increase rate of Tg in the plastic lens of each Production Example with respect to Tg in the plastic lens of Production Example 6.

TABLE 1

|  | Example 1 | Example 2 | Example 3 | Example 4 | Example 5 |
|---|---|---|---|---|---|
| Peak area of polythiol compound (B) with respect to total peak area 100 of compounds included in polythiol composition | 2.4 | 5.1 | 9.6 | 14.3 | 19.2 |
| Peak area of polythiol compound (A) with respect to | 85.4 | 82.4 | 78.1 | 73.6 | 69.1 |

TABLE 1-continued

|  |  | Example 1 | Example 2 | Example 3 | Example 4 | Example 5 |
|---|---|---|---|---|---|---|
| total peak area 100 of compounds included in polythiol composition |  |  |  |  |  |  |
| Peak area of polythiol compound (B) with respect to total peak area 100 of polythiol compound (A) and polythiol compound (B) |  | 2.8 | 5.8 | 10.9 | 16.3 | 21.7 |
| Peak area of polythiol compound (A) with respect to total peak area 100 of polythiol compound (A) and polythiol compound (B) |  | 97.2 | 94.2 | 89.1 | 83.7 | 78.3 |
| Optical properties | Refractive index ne | 1.6680 | 1.6681 | 1.6678 | 1.6677 | 1.6674 |
|  | Abbe number νe | 30.9 | 31.2 | 31.0 | 30.9 | 31.3 |
| Heat properties | Heat resistance [° C.] | 102.8 | 102.9 | 102.9 | 102.0 | 101.1 |
|  | ΔTg | 18.2 | 18.3 | 18.3 | 17.3 | 16.1 |
| Resin specific density [20° C.] |  | 1.368 | 1.368 | 1.368 | 1.367 | 1.367 |
| Color phase | YI | 5.3 | 5.3 | 5.3 | 5.3 | 5.3 |
| Dyeability (Light transmittance) (%) | 638 nm | 52.92 | 51.71 | 48.74 | 46.33 | 42.94 |
|  | 567 nm | 55.34 | 54.16 | 51.27 | 48.91 | 45.60 |
|  | 452 nm | 68.53 | 67.86 | 66.03 | 64.32 | 62.09 |

As shown in the above-mentioned Table 1, the polythiol composition in the present disclosure can manufacture a resin excellent in balance between heat resistance and dyeability by including two kinds of polythiol compounds.

Further, as shown in Table 1, in a case in which the peak area ratio of the polythiol compound (B) is 10 or less with respect to the total peak area 100 of compounds included in the polythiol composition, it was found that the dyeability can be adjusted while maintaining high heat resistance.

The disclosure of Japanese Patent Application 2019-131886, filed on Jul. 7, 2019 is incorporated herein by reference in their entirety.

All publications, patent applications, and technical standards mentioned in the present specification are incorporated herein by reference to the same extent as if each individual publication, patent application, or technical standard was specifically and individually indicated to be incorporated by reference.

The invention claimed is:

1. A polythiol composition, comprising:
 a polythiol compound (A) including at least one of 4,8-dimercaptomethyl-1,11-dimercapto-3,6,9-trithiaundecane, 4,7-dimercaptomethyl-1,11-dimercapto-3,6,9-trithiaundecane, or 5,7-dimercaptomethyl-1,11-dimercapto-3,6,9-trithiaundecane, and
 a polythiol compound (B) that is 4-mercaptomethyl-1,8-dimercapto-3,6-dithiaoctane, wherein, in a high performance liquid chromatography measurement, a peak area of the polythiol compound (B) is 10 or less with respect to a total peak area 100 of compounds included in the polythiol composition and a peak area of the polythiol compound (A) is 76 or more with respect to a total peak area 100 of compounds included in the polythiol composition.

2. The polythiol composition according to claim 1, wherein, in a high performance liquid chromatography measurement, a peak area of the polythiol compound (B) is 0.5 or more with respect to a total peak area 100 of compounds included in the polythiol composition.

3. The polythiol composition according to claim 1, wherein, in a high performance liquid chromatography measurement, a peak area of the polythiol compound (B) is 4 or more with respect to a total peak area 100 of compounds included in the polythiol composition.

4. The polythiol composition according to claim 2, wherein, in a high performance liquid chromatography measurement, a peak area of the polythiol compound (B) is 1.1 or less with respect to a total peak area 100 of compounds included in the polythiol composition.

5. The polythiol composition according to claim 1, wherein, in a high performance liquid chromatography measurement, a peak area of the polythiol compound (B) is more than 5.2 and less than 8.5 with respect to a total peak area 100 of compounds included in the polythiol composition.

6. The polythiol composition according to claim 1, wherein, in a high performance liquid chromatography measurement, a peak area of the polythiol compound (A) is 90 or less with respect to a total peak area 100 of compounds included in the polythiol composition.

7. The polythiol composition according to claim 1, wherein, in a high performance liquid chromatography measurement, a peak area of the polythiol compound (B) is 0.5 or more with respect to a total peak area 100 of the polythiol compound (A) and the polythiol compound (B).

8. The polythiol composition according to claim 1, wherein the polythiol compound (A) is a compound obtained by using a catalyst including at least one selected from the group consisting of a metal hydroxide and a metal carbonate in a case of reacting 2-mercaptoethanol and an epihalohydrin compound represented by the following formula (5):

(5)

9. The polythiol composition according to claim 1, wherein the polythiol compound (B) is a compound obtained by using a catalyst including at least one selected from the group consisting of a metal hydroxide and a metal carbonate in a case of reacting 2-mercaptoethanol and an epihalohydrin compound represented by the following formula (5):

(5)

10. A polymerizable composition, comprising: the polythiol composition according to claim 1, and a polyiso (thio) cyanate compound.

11. The polymerizable composition according to claim 10, wherein the polyiso (thio) cyanate compound includes at least one selected from pentamethylene diisocyanate, hexamethylene diisocyanate, xylylene diisocyanate, isophorone diisocyanate, bis(isocyanatomethyl)cyclohexane, bis(isocyanatocyclohexyl)methane, 2,5-bis(isocyanatomethyl)bicyclo-[2.2.1]-heptane, 2,6-bis(isocyanatomethyl)bicyclo-[2.2.1]-heptane, tolylene diisocyanate, 4,4'-diphenylmethane diisocyanate or phenylenediisocyanate.

12. A resin formed by curing the polymerizable composition according to claim 10.

13. A molded body comprising the resin according to claim 12.

14. A optical material comprising the resin according to claim 12.

15. A lens comprising the resin according to claim 12.

* * * * *